United States Patent [19]

Christenson et al.

[11] Patent Number: 4,848,783
[45] Date of Patent: Jul. 18, 1989

[54] TUCK-A-WAY TAG AXLE ASSEMBLY FOR WORK VEHICLE

[75] Inventors: Ronald E. Christenson, Mantorville; Daniel R. St. Onge, Edina, both of Minn.

[73] Assignee: McNeilus Truck and Manufacturing, Inc., Dodge Center, Minn.

[21] Appl. No.: 813,419

[22] Filed: Dec. 26, 1985

Related U.S. Application Data

[63] Continuation of Ser. No. 660,713, Oct. 15, 1984, abandoned.

[51] Int. Cl.$^4$ .......................... B60S 9/00; B62D 61/12
[52] U.S. Cl. .................................. 280/405.1; 280/704; 280/81.6
[58] Field of Search ................. 280/405 R, 81 A, 704, 280/43.23, 81 R, 81 J; 180/24.02, 22

[56] References Cited

U.S. PATENT DOCUMENTS

| | | | |
|---|---|---|---|
| 2,918,298 | 12/1959 | Starr | 280/43.23 |
| 2,961,249 | 11/1960 | Petersen et al. | 280/31 |
| 3,112,100 | 11/1963 | Prichard | 280/405 R |
| 3,199,890 | 8/1965 | Caldwell | 280/43.23 |
| 3,704,896 | 12/1972 | Buelow | 280/81 A |
| 3,831,210 | 8/1974 | Ow | 280/414.5 |
| 3,877,715 | 4/1975 | Thayer | 280/81 A |
| 3,895,818 | 7/1975 | Fearon | 280/81 R |
| 3,912,293 | 10/1975 | Harbers | 280/81 R |
| 4,065,153 | 12/1977 | Pringle | 280/704 |
| 4,079,798 | 3/1978 | Ferris | 280/405 R |
| 4,082,305 | 4/1978 | Allison et al. | 280/81 R |
| 4,084,833 | 4/1978 | Mohrbacker et al. | 280/81 A |
| 4,102,424 | 7/1978 | Heinze | 180/24.02 |
| 4,314,709 | 2/1982 | Silbernagel | 280/405 R |
| 4,373,738 | 2/1983 | Lange | 280/81 A |

Primary Examiner—Richard A. Bertsch
Attorney, Agent, or Firm—Orrin M. Haugen; Thomas J. Nikolai; Frederick W. Niebuhr

[57] ABSTRACT

An add-on wheel/axle assembly for truck-type vehicles for reducing the effective axle load of the vehicle allowing the carrying of greater payloads without violating Governmentally imposed road restrictions. The assembly includes a hydraulically actuatable articulated arm assembly where one end of a first arm link is pivotally joined to opposed sides of the truck frame proximate its rear end and with wheels mounted on stub axles affixed to the other ends of said arm assemblies. A cross-member offset by a predetermined distance from the stub axles joins the arm assemblies together and a hydraulic cylinder is operatively coupled between the truck frame and the articulated arms for extending and retracting the wheels between a ground-engaging disposition and an elevated disposition. Further hydraulic cylinders also cooperate with the articulated arms to draw the wheels in a straddling disposition relative to the truck frame when the wheels are in their elevated disposition.

6 Claims, 3 Drawing Sheets

TUCK-A-WAY TAG AXLE ASSEMBLY FOR WORK VEHICLE

This is a continuation of application Ser. No. 660,713, filed Oct. 15, 1984, now abandoned.

BACKGROUND OF THE INVENTION

I. Field of the Invention

This invention relates generally to an auxiliary wheel/axle assembly for a work-type vehicle and more particularly to an improved tag wheel/axle assembly attachable to the rear end of a vehicle and which can be selectively deployed into a ground-engaging disposition or retracted to an elevated disposition where the wheels straddle the sides of the truck frame.

II. Discussion of the Prior Art

To prevent undue deterioration of highhways and other road surfaces, states and/or the Federal Government impose weight restrictions on vehicles traveling over those highways. Most commonly, the weight restrictions are measured in terms of load per axle and the overall spacing between axles. It is readily apparent that if the number of axles of the truck and the spacing thereof can be increased, a given vehicle may carry a higher payload than would otherwise be permitted. Included in the prior art are numerous devices designed to achieve the foregoing end. For example, in the arrangement shown in the Prichard U.S. Pat. No. 3,112,100, a tag wheel assembly is attached to the rear of a ready-mix concrete truck and the wheels are mounted on a transversely extending axle, the axle being joined by elongated arms which are pivotally coupled to opposed sides of the truck frame. A hydraulic cylinder is operatively coupled to the truck body and to the arms and when its piston is retracted, the tag axle assembly is elevated through pure rotation of the non-articulated arms to a substantial height above the ground. In retracted mode, the wheels are above the center of gravity, making the vehicle top-heavy. Also, the machine constructed in accordance with the Prichard patent can only be unloaded when the tag axle is in its elevated disposition which may not be legally unloaded when the ready-mix truck is on a Federal highway.

In the case of the Silbernagel U.S. Pat. No. 4,314,709, when the tag axle assembly is elevated, it interferes with thee unloading of the ready-mix concrete truck. Still other designs, such as is disclosed in the Allison et al U.S. Pat. No. 4,082,305, do not allow the auxiliary wheels to be lifted to a sufficiently high level to clear curbs or rough terrain when leaving the road and entering the construction area.

SUMMARY OF THE INVENTION

In accordance with the present invention, a unique axle arrangement and system of articulated linkages actuated by first and second hydraulic cylinders has been devised so that when a truck, such as a concrete mixer, arrives at the job site, the articulating tag wheel assembly may be elevated from its road-engaging disposition to an alternate disposition in which the wheels straddle the side of the truck frame with the bottom of the tires being sufficiently high to clear the most uneven of terrain, yet low enough so as to not present a safety hazard in the event of a hydraulic failure. Also, either in this frame-straddling disposition or in the fully-extended, over-the-road disposition, the articulating tag axle assembly of the present invention does ot obstruct the unloading of the concrete from the ready-mix vehicle.

The articulating tag axle assembly of the present invention comprises a plurality of wheels journaled for rotation on stub axles, the stub axles being affixed to opposed ones of parallel, spaced-apart, angulated arms near one end thereof. A cross-bar, disposed off of center of the axis of the stub axles, extends between these opposed arms at a location which is more distant from the rear of the truck than the axis of the stub axles. By offsetting the cross-bar in this manner, upon retraction of the articulating tag wheel assembly, the wheels can be raised to a significantly greater elevation than could otherwise be achieved using a conventional axle arrangement.

The aforementioned spaced-apart angulated arms are pivotally joined at their other end to first and second straight arm segments which are also pivotally joined to the truck frame proximate its rear end. A first or main hydraulic ram is operatively coupled between the truck frame and one of the two pivot arms. A pair of secondary hydraulic cylinders are operatively coupled between the straight arm segments and the above-described agulated arms. By appropriate operation of the main and secondary hydraulic cylinders, the wheels can be moved from a first or stowed disposition to a second road-engaging disposition and vice-versa. When in the stowed disposition, the wheels of the articulating tag axle assembly are made to straddle the opposed sides of the vehicle's frame and because the spacer bar is offset from the axis of the stub axles, the center of the wheels actually is elevated above the lowermost edges of the frame.

When the main and secondary hydraulic cylinders have their pistons extended to the point where the wheels are in their full, ground-engaging disposition, suitable stop means are provided at the pivot joint between the angulated arms of the articulating axle assembly and the straight arm segments to prevent inversion of the joint and the loss of force applied between the tag wheel tires and the road.

OBJECTS

It is accordingly a principal object of the present invention to provide an improved articulating tag axle assembly for a work vehicle.

Another object of the invention is to provide a tag axle assembly in which the auxiliary wheels thereof are made to straddle the sides of the truck frame when in their stowed disposition with the low-point of the tires and drop axle at an elevation permitting them to clear the roughest of terrain.

A further object of the invention is to provide a novel axle assembly in which stub axles on which the wheels are mounted project outwardly from a pair of angulated arms and where the arms are joined together by a solid spacer bar which is at a greater distance from the truck body than is the axis of the stub axles.

Still another object of the invention is to provide a rugged, steerable, selectively deployable articulating tag axle assembly for a work vehicle, such as a ready-mix concrete truck, which either when stowed or when fully extended does not interfere with the chute used in unloading the vehicle.

Another object of the invention is to keep the articulating axle assembly below the center of gravity of the work vehicle. In addition, the axle will not drop from the stowed position, even in the case of a complete hydraulic failure.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
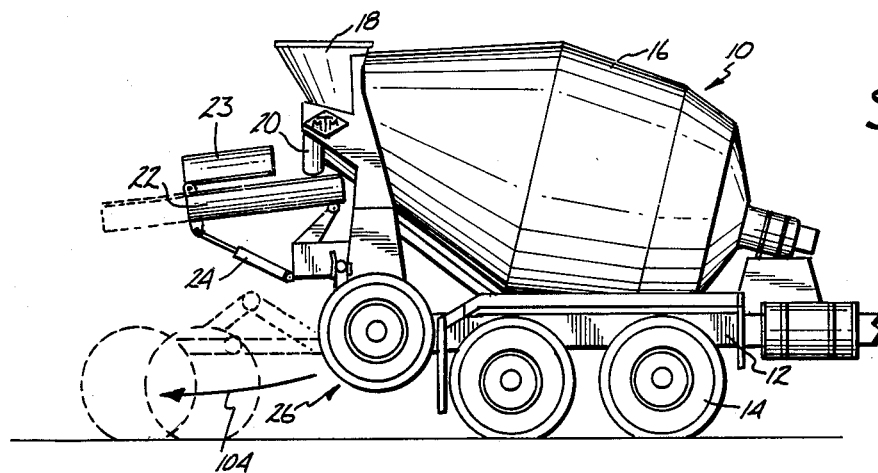
FIG. 1 is a partial side elevation of a ready-mix concrete truck incorporating the present invention and showing the orientation of thee articulating tag axle assembly when in its stowed position in solid line and in its ground-engaging disposition in phantom lines.

At the outset, it should be mentioned that certain terminology will be used in the following description for convenience in reference only and should not be considered as limiting of the invention. The words "upwardly", "downwardly", "rightwardly, leftwardly", "forwardly" and "rearwardly" will refer to directions in the drawings in which reference is made. The words "inwardly" and "outwardly" will refer to directions toward and away from, respectively, the geometric center of the device and associated parts thereof. This terminology is intended to include the words specifically mentioned above as well as derivatives thereof and words of similar import.

With reference to FIG. 1, a work-type vehicle, namely a ready-mix concrete truck is indicated generally by the numeral 10. It includes a frame 12 which is supported from the ground by a plurality of wheel/axle assemblies 14, 15 in a conventional fashion. Supported on the frame 12 is a rotatable mixer drum 16 having a funnel like opening 18 proximate the rear top end thereof through which sand, cement, water and other additives, such as gravel, can be loaded. The mixer is mounted on a truck chassis (not shown) or pulled to a construction site by a truck tractor (not shown) and, while in transit, the drum 16 rotates to mix the ingredients contained therein.

As has been mentioned in the introductory portion of this specification, most states maintain road restrictions limiting the amount of weight that a vehicle can carry while traversing the roads and highways of those states. Such weight restrictions are measured in terms of axle weight, i.e., pounds-per-axle and, as such, greater loads may legally be transported by increasing the number of wheel/axle pairs. Furthermore, weight restrictions are commonly also a function of the distance between axles, it being recognized that by increasing the distance between axles, the effective distribution of the load on the road surface will meet government regulations.

A now, well-recognized approach to increasing the payload of a work vehicle, such as a concrete mixer 10, is to add a tag axle assembly to the rear of the frame. Generally, the tag wheels are not power driven as are the convetional truck wheels 14. Hence, the tag wheels can be an impediment when the vehicle reaches the construction site and must travel over rough, uneven and sometimes muddy or soft terrain. It has been the practice to design the tag wheel assemblies so that the wheels may be elevated once the vehicle is about to leave the public road. The most common approach and the one best illustrated in the Buelow U.S. Pat. No. 3,704,896 is to suspend the tag axle from a pair of arms pivotally joined to the rear portion of the truck frame proximate its rear end and then employ hydraulic cylinders disposed between the frame and the axle for elevating the tag wheel. The downward pressure used to force the tag wheels against the road comprise conventional air bags. Using the approach of the Buelow patent, however, only allows a small or limited raising of the tag wheel above the road surface. This limited elevation is in many instances not sufficiently high so as to permit the tag wheel assembly to clear curbs, rocks and other obstructions and may also dig into the ground if the cement truck is traversing soft soil.

Located beneath the filling sprout 18 is a discharge spout 20 through which the cement or concrete is emptied once the vehicle arrives at the construction site. A discharge chute 22, which can be positioned upward by means of a hydraulic actuator 24, is used to cause the concrete to flow to a bucket, wheel barrel or to the space defined by erected concrete forms. Chute 22 can be extended by adding on further chute segments such as at 23.

The present invention comprises an ariculating tag axle assembly which is indicated generally by numeral 26 in FIG. 1. The articulating tag axle assembly 26 is shown in solid line form in FIG. 1 in its raised or stowed disposition and in phantom line representation as it is being extended to its road-engaging orientation.

Figure 2:
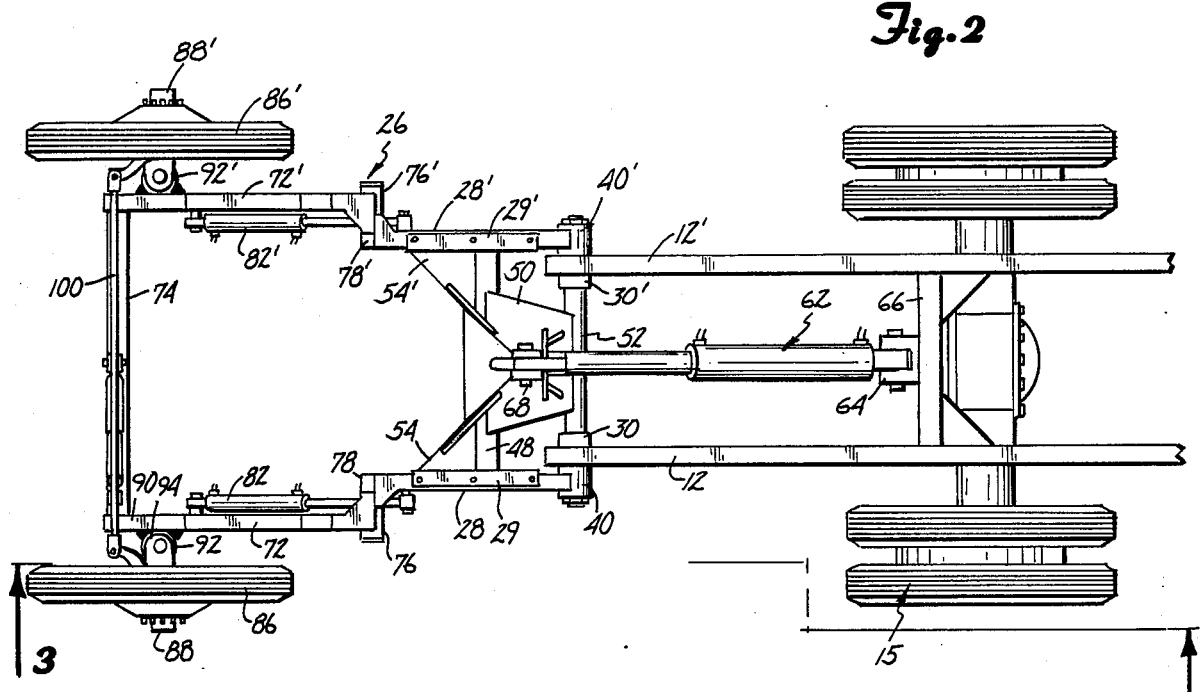
FIG. 2 is a top plan view of the truck frame showing the articulating tag axle assembly of this invention in the ground-engaging disposition.
Figure 3:
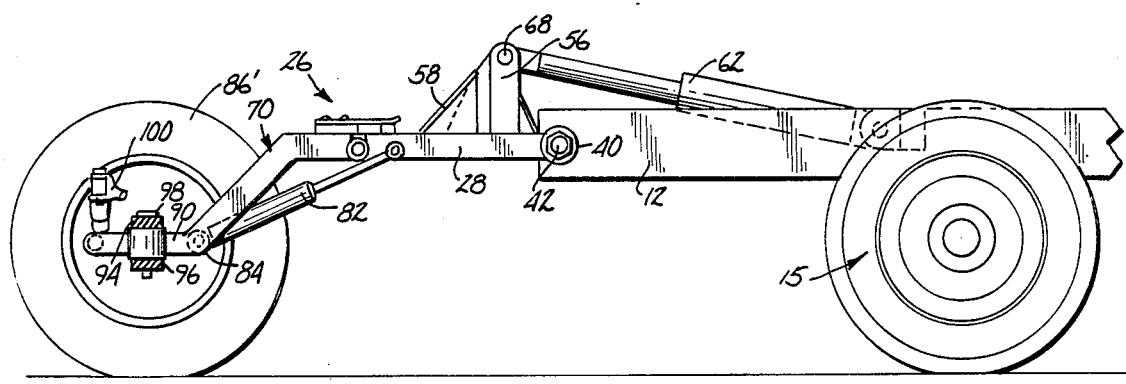
FIG. 3 is a side sectional view of the assembly taken along lines 3—3 in FIG. 2.
Figure 9:
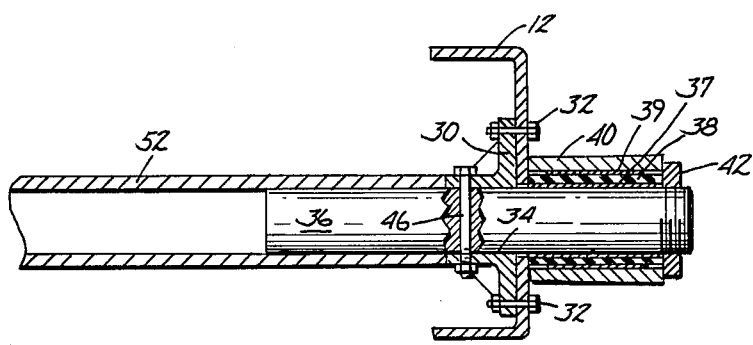
FIG. 9 is a cross-sectional view of the pivot attachment of the articulating tag axle assembly to the frame of the vehicle.

Referring next to FIGS. 2 and 3, the construction details of the preferred embodiment will be explained. The tag axle assembly comprises first and second torque arms 28 and 28' which are pivotally secured to the side frame members 12 and 12' proximate their rear ends. More specifically, and with reference to FIG. 9, there is shown a bracket 30 which is secured to the inside surface of the frame 12 by means of bolts 32, the bracket 30 having a central bore 34 which is aligned to a hole of the frame 12. An elongated pivot pin 36 passes through the circular bore of bracket 30 and through the hole in frame 12, and surrounding the outwardly projecting portion of the pin 36 is a sleeve bearing 38 which is preferably in the form of an inner steel sleeve 37, an intermediate sleeve 38 and an outer steel sleeve 39. The pivot pin 36 and the bearing assembly are received within the cylindrical bore of a hub 40 and an externally threaded segment of pin 36 extends outward beyond the end of hub 40. A lock nut 42 is screwed onto the threaded end of the pivot pin 36 to hold the bearing assembly in place. The pivot pin 36 is precluded from rotating by a bolt 46 which passes through aligned apertures formed in the tubular portion of the bracket 30 and in the pivot pin 36.

Welded to the hubs 40 and 40' are the torque arms 28 and 28' (FIG. 2). Thus, these torque arms are free to rotate about the pivot pin 36 with the rubber bushing assembly providing good sliding contact while affording a degree of resiliency for shock and vibration absorbing purposes.

Extending between the torque arms 28 and 28' so as to maintain them in a parallel, spaced-apart relationship is a cross beam 48. More specifically, partially surrounding the arms 28 and 28' are C-channel members 29 and 29' whicha re bolted to the arms 28 and 28' and the heavy steel bar or beam 48 is welded at opposed ends to the C-channel members. A heavy, rugged support plate 50 is welded to the cross member 48 and to a steel pipe 52 which surrounds and is free to rotate about the pivot pins 36 (See FIG. 9). Further reinforcing gussets 54 and 54' are welded between the cross member 48 and the C-channels 29 and 29', respectively.

Welded to and projecting upwardly from the support plate 50 (when viewed as in FIG. 2) is a torque or horn arm 56 which is bifurcated at its upper end so as to allow a clevis connection to be made thereto. Again, triangular gussets as at 58 and 60 may be used to strengthen the attachment of the horn 56 to the support plate 50.

Referring to FIGS. 2 and 3, it can be seen that a main hydraulic actuator 62 has one end of its piston rod or cylinder coupled by means of a clevis connection 64 to the vehicle frame member 66 and the other end of its piston rod/cylinder pivotally joined to the horn 56 by a clevis pin 68.

Figure 8:
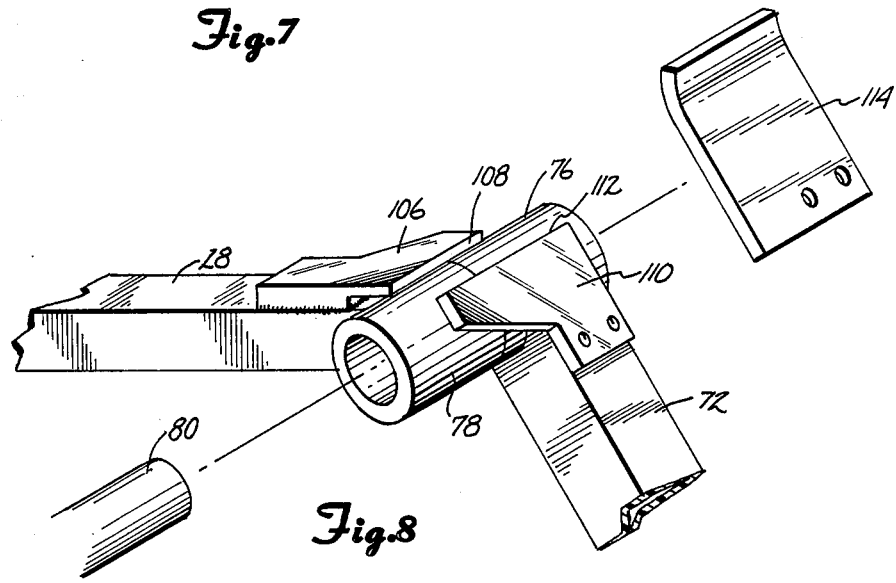
FIG. 8 is an enlarged, blown-apart, partial view of the pivot joints between the straight arms and the angulated arms.

Hinged to the rearward ends of the torque arms 28 and 28' is a drop axle assembly indicated generally by numeral 70. The drop axle assembly 70 is seen to comprise a pair of angulated arms 72 and 72', the two arms being joined one to the other by way of a tubular drop axle 74. As can be seen in FIGS. 3 and 8, the angular arm 72 is somewhat angulated in shape. It terminates at its upper end in a tubular hub 76. When hub 76 is aligned laterally with a corresponding tubular hub 78 formed on the end of the torque arm 28, it allows a hinge pin 80 to be inserted into the central openings of each, allowing pivoting movement of the drop axle assembly 70 relative to the torque arms 28 and 28'. Hydraulic cylinders 82 and 82' have one or the other of their pistons or cylinders pivotally secured to the torque arms 28 or 28', the other of its pistons or cylinders being pivotally joined to the assembly proximate the lower bend or transition zone 84 angular arm 72 and 72'. Thus, actuation of the secondary cylinders 82 and 82' cause relative rotational movement of the drop axle assembly 70 about the torque arms 28 and 28' while the main hydraulic cylinder 62 causes the torque arms 28 and 28' to rotate relative to the rear ends of the truck frame 12. While the angular arm 72 is shown as having a modified S-shape, it is possible that these arms can be straight from the upper pivot hub 76 down to the transition zone 84.

Figure 7:
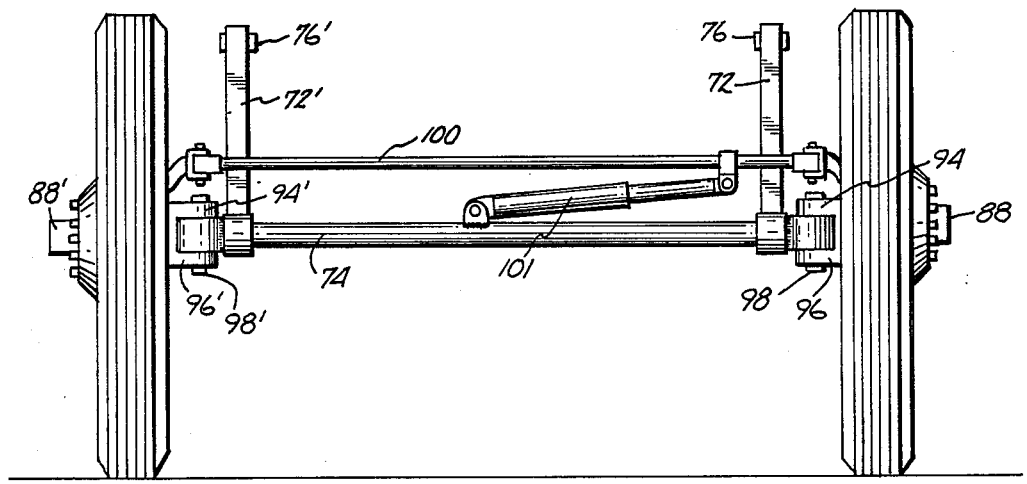
FIG. 7 is a partial rear elevation of the articulating tag wheel assembly.

With reference to FIGS. 2 and 3, the tires 86 and 86' of the articulating tag wheel assembly 26 are mounted in a conventional fashion and the wheel hubs are arranged to rotate about stub axles 88 which, in turn, are caster-mounted on the lower, horizontal portion 90 of the angular arms 72 and 72' of assembly 70. More particularly, and as can be seen in FIGS. 2, 3 and 7, a cylindrical member 92 is welded to the arm 72 midway along the lower arm segment 90(FIG. 3), and a vertical bore is formed through the segment 92. Stub axles 88 and 88' have bifurcated ends 94 and 96. The spacing between the bifurcated ends then permits the cylindrical member 92 to be inserted therebetween and a pin 98 is inserted through aligned holes in the ends 94 and 96 and through the bore formed in the stub 92 to provide caster movement of the wheels. A tie rod 100 is disposed between the wheels in a conventional fashion so that the wheels will remain in alignment with one another while the vehicle is cornering.

It is important to note that the spacing between the arms 72 and 72' of assembly 70 is slightly greater than the width of the truck frame and that the stub axles 88 project laterally outwardly from the angular arms 72 and 72' of assembly 70 at a location which is forwardly offset. As will be explained in greater detail, it is the positioning of the stub axles relative to the drop axle and the fact that the hydraulically actuated arms of the articulating tag axle assembly are articulated that permits the wheels of the articulating tag axle assembly to straddle the sides of the frame at a substantial elevation relative to the ground when the articulating tag axle assembly is in its stowed disposition. In prior art designs, upon moving the tag axle assembly to its stowed disposition, the conventional axle on which the tag wheels are mounted come into contact with the underside of the frame and preclude their being lifted to a height elevation permitted by the present invention.

Figure 4:
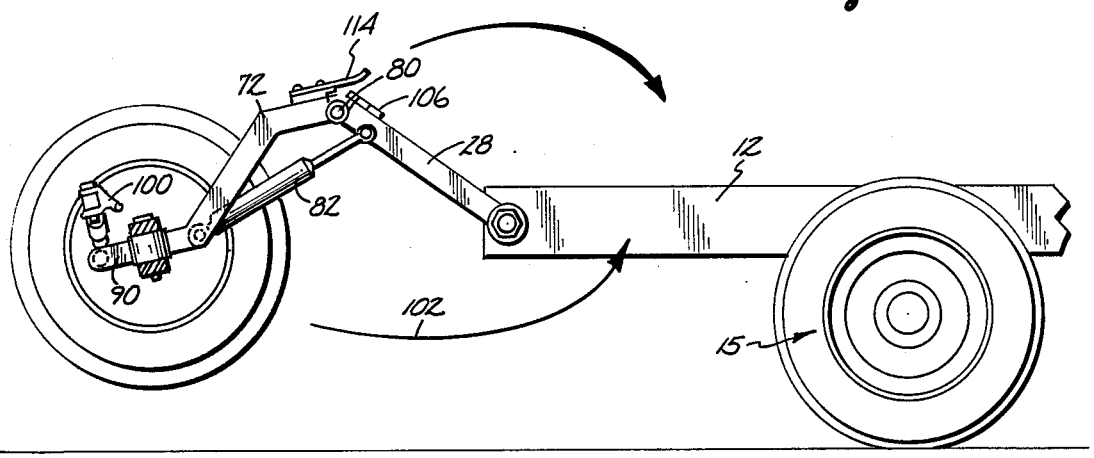
FIG. 4 is a side sectional view as in FIG. 3 but showing the orientation of the articulating tag wheel assembly midway between its stowed and ground-engaging disposition.
Figure 5:
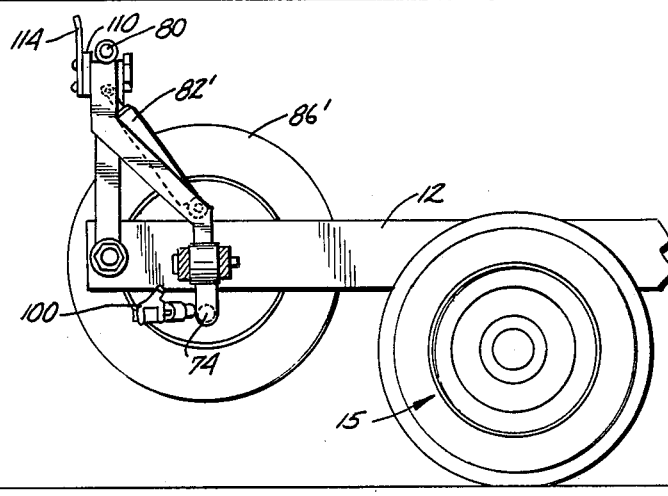
FIG. 5 is a partial side view showing the articulating tag wheel assembly in its fully stowed disposition.
Figure 6:
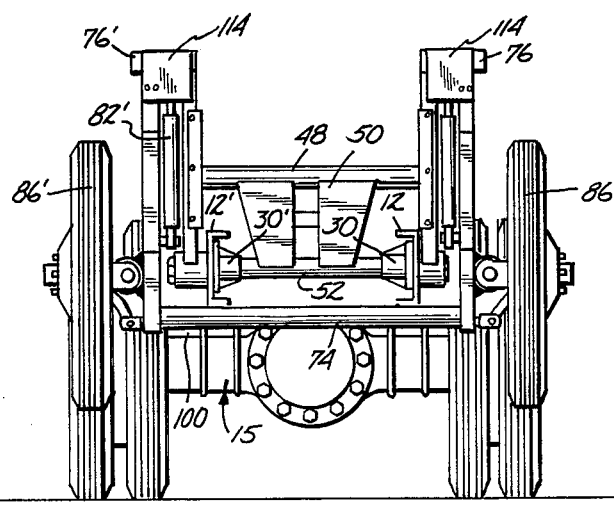
FIG. 6 is a rear elevation of the vehicle, again showing the articulating tag axle assembly in its fully stowed disposition.

Referring to FIGS. 3, 4 and 5, in shifting the disposition of the articulating tag assembly from its extended disposition to its stowed disposition, an operator maneuvers a suitable hydraulic control lever or electric switch (not shown) so as to cause the rod of the hydraulic actuator 62 to retract into its cylinder and, in doing so, a torque is applied to the torque arm 28 via the clevis or horm mechanism 56, causing the torque arm 28 to rotate in a clockwise direction when viewed as in FIG. 3. This action begins to lift the drop axle assembly 70. Once the tires of the tag wheels are free of the ground, the smaller, secondary hydraulic actuators 82 and 82' will automatically retract the rods thereof into their cylinders. This has the effect of rotating the drop axle assembly counterclockwise in the direction of the arrow 102 in FIG. 4. The continued actuation of the main hydraulic cylinder 62 and the secondary cylinders 82 and 82' moves the articulating tag wheel assembly 26 to the stowed disposition as indicated in FIG. 5. It can be seen that in this disposition, the drop axle 74 of assembly 70 and the tie-rod 100 fits snugly beneath the underside of the frame 12 - 12'. Because the stub axles project from the angular arm 72 at a location forward of the drop axle 74 of assembly 70, the bottom of the wheels 86 - 86' are at a substantially greater elevation than can be achieved if a conventional axle is utilized, as distinguished from a stub axle.

In deploying the tag axle assembly for over-the road use, the operator again actuates the appropriate hydraulic control levers, this time to extend the rods of the actuators 62 and 82 - 82' from their respective cylinders. This action swings the drop axle assembly rearward relative to the frame of the truck as indicated by the arrow 104 in FIG. 1 to its fully extended disposition shown in FIG. 3. To prevent the arms 28 and 72 from inverting downward about the hinge joint held together by the hinge pin 80 and the attendant loss of pressure between the tag wheel tires and the road, a stop means is provided which can best be seen in the drawing of FIG. 8.

Welded to the torque arm 28 is a stop plate 106 having a front edge 108 extending approximately midway over the tubular hubs 76 and 78. Likewise, a mating stop plate 110 is welded to the angular arm 72 of assembly 70 and has a working face 112 which extends approximately halfway over the hubs 76 and 78. When the articulating tag wheel assembly is fully extended, the working faces 108 and 112 of the respective stop plates 106 and 110 come together and prevent further rotation of the arms 28 and 72 relative to one another. To prevent accidental injury, a heavy rubber sheet 114 is bolted to the exposed upper surface of the stop plate 110 and overlaps the hubs 78 and 76 so as to overlay the stop plate 106. This rubber guard member shields the gap between the stop plates as they come together.

The invention has been described herein in considerable detail in order to comply with the Patent Statues and to provide those skilled in the art with the information needed to apply the novel principles and to construct and use such specialized components as are required. Hence, it is to be understood that the invention can be carried out by specifically different equipment and devices, and that various modifications, both as to equipment details and operating procedures, can be accomplished without departing from the scope of the invention itself.

What is claimed is:

1. In combination with a truck of the type having a longitudinally extending frame including first and second spaced-apart side members supported on a plurality of transversely extending axles, said axles each having one or more wheels affixed to the opposite ends thereof, a hydraulically actuable tag axle assembly comprising:
    (a) first and second articulated arm means, each including:
        (i) a first linkage pivotally attached at a first end thereof to one of said first and second side members of said frame proximate the rear end of said one of said side members, said first linkage having a laterally projecting hub with a central bore extending transversely to the longitudinal axis of said first linkage,
        (ii) a second linkage having a laterally projecting hub with a central bore, and
        (iii) a hinge pin extending through said central bores of said hubs on said first and second linkages when said bores are laterally aligned;
    (b) first and second stub axle means pivotally joined to said second linkages of said first and second articulated arm means;
    (c) further wheel means journaled for rotation on said first and second stub axle means;
    (d) a drop axle, joined between said second linkages of said first and second articulated arm means, said drop axle including a transversely extending bar or a length sufficient to span the width dimension of said frame; and
    (e) hydraulic actuator means operatively coupled to said articulated arm means and to said frame for moving said further wheel means between a ground-engaging disposition and an elevated disposition along side said first and second side members of said frame, with said transversely extending bar of said drop axle extending transversely beneath said frame.

2. The combination as in claim 1 and further including tie-rod means joining said wheel means on said first and second stub axles, said tie-rod being in general parallel alignment wihth said transversely extending bar.

3. In combination with a truck of the type having a longitudinally extending frame including first and second spaced-apart side members supported on a plurality of transversely extending axles, said axles each having one or more wheels affixed to the opposite ends thereof, a hydraulically actuatable tag axle assembly comprising:
    (a) first and second articulated arm means, each including:
        (1) a first linkage pivotally attached at a first end thereof to one of said first and second side members of said frame proximate the rear end of said one of said side members, said first linkage having a laterally projecting hub with a central bore extending bore extending transverse to the longitudinal axis of said first linkage,
        (2) a second linkage having first and second parallel segments joined by an integrally formed transversal to define equal alternate obtuse angles, said first segment of said second linkage having a laterally projecting hub with a central bore, and
        (3) a hinge pin extending through side central bores of said hubs on said first and second linkages when said bores are laterally aligned;
    (b) first and second stub axle means extending perpendicularly to said second segments of said first and second articulated arm means, respectively;
    (c) further wheel means journaled for rotation on said first and second stub axle means;
    (d) a drop axle including a transversely extending bar of a length sufficient to span the width dimension of said frame, said bar connecting said second segment of said second linkage of said first articulated arm means to said second segment of said second linkage of said second articulated arm means; and
    (e) hydraulic actuator means including
        (1) a main hydraulic cylinder, operatively coupled between said frame and said first linkages of said first and second articulated arm means, and
        (2) a pair of secondary hydraulic cylinders operatively coupled between said first and second linkages of said first and second articulated arm means for moving said further wheel means between a ground-engaging disposition and an elevated disposition alongside said first and second side members of said frame.

4. The combination as in claim 3 and further including stop means attached to said first and second linkages of said first and second articulated arm means to limit the angle through which said first and second linkages can rotate relative to one another.

5. The combination as in claim 4 wherein the angle through which said first and second linkages can rotate relative to one another during extension is less than 180°.

6. The combination as in claim 3 wherein said transversely extending bar is affixed to said second segment of said second linkage of said first and second articulated arm means at a location displaced a predetermined distance beyond the location where said stub axles extend perpendicular from said second segments of said second linkage of said first and second articulated arm means.

* * * * *

UNITED STATES PATENT AND TRADEMARK OFFICE
CERTIFICATE OF CORRECTION

PATENT NO. : 4,848,783

DATED : July 18, 1989

INVENTOR(S) : Ronald E. Christenson and Daniel R. St. Onge

It is certified that error appears in the above-identified patent and that said Letters Patent is hereby corrected as shown below:

Column 7, Line 60, "or" should read -- of --.

Column 8, Line 6, "wihth" should read -- with --.

Column 8, Line 21, "bore extending" should be deleted in the second occurrence.

Column 8, Line 27, "side" should read -- said --.

Signed and Sealed this

Twenty-fourth Day of April, 1990

Attest:

HARRY F. MANBECK, JR.

*Attesting Officer*  *Commissioner of Patents and Trademarks*